Figure 1:
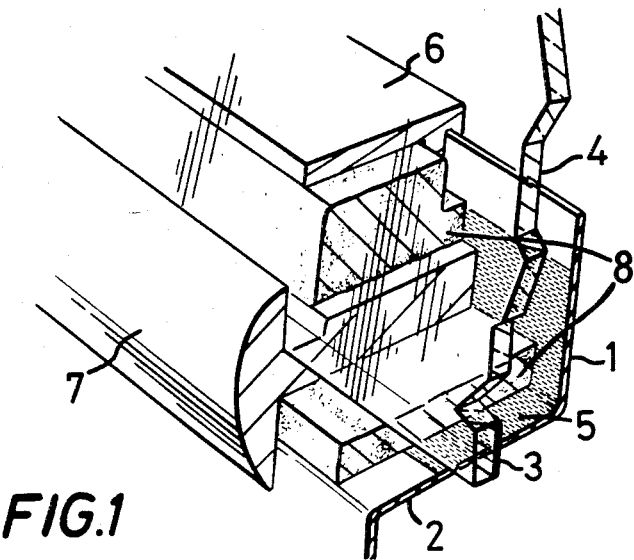

United States Patent [19]

Mangan

[11] Patent Number: 4,531,335

[45] Date of Patent: Jul. 30, 1985

[54] CLIP AND ARRANGEMENT FOR FLUSH FITTING OF WINDOWS

[76] Inventor: Denis Mangan, 48 Mendip Way, Sundon Park, Luton, Bedfordshire LU3 3JL, United Kingdom

[21] Appl. No.: 447,961

[22] Filed: Dec. 8, 1982

[30] Foreign Application Priority Data

Dec. 22, 1981 [GB] United Kingdom ............... 8138478

[51] Int. Cl.³ .............................................. E06B 3/00
[52] U.S. Cl. ..................................... 52/208; 29/450; 52/714; 52/718; 296/84 A; 296/206
[58] Field of Search ...................... 296/84 R, 84 A, 93, 296/206; 52/208, 489, 714, 717, 718, 764, 771, 772, 773, 804, 824; 29/450; 24/530, 563; 160/368 S

[56] References Cited

U.S. PATENT DOCUMENTS

| | | | |
|---|---|---|---|
| 1,520,739 | 12/1924 | Zetlitz | 24/563 |
| 1,873,350 | 8/1932 | Smith | 52/770 |
| 2,270,036 | 1/1942 | Conlon | 52/764 X |
| 2,467,604 | 4/1949 | Tinnerman et al. | 24/563 X |
| 2,715,250 | 8/1955 | Bedford, Jr. | 296/206 X |
| 2,751,653 | 6/1956 | Leibow | 24/563 X |
| 3,245,182 | 4/1966 | Zierold | 296/84 R X |
| 4,135,277 | 1/1979 | Taniai et al. | 296/84 R X |
| 4,278,286 | 7/1981 | Kiba et al. | 296/93 |
| 4,389,068 | 6/1983 | Sengoku | 296/206 |
| 4,389,069 | 6/1983 | Sengoku | 296/206 |

FOREIGN PATENT DOCUMENTS

| | | | |
|---|---|---|---|
| 248831 | 5/1963 | Australia | 296/84 R |
| 705797 | 3/1965 | Canada | 296/84 R |
| 2723255 | 11/1978 | Fed. Rep. of Germany | 296/84 R |
| 1394484 | 4/1964 | France | . |
| 802586 | 10/1958 | United Kingdom | 52/718 |

*Primary Examiner*—Howard N. Goldberg
*Assistant Examiner*—Ronald S. Wallace
*Attorney, Agent, or Firm*—Hayes, Davis & Soloway

[57] ABSTRACT

The method of applying a glass flushly to a flanged window aperture comprises the steps of attaching resilient fixing clips (10), which have means (11) for attachment to the glass (4) and catch means (16) for locating positively on the window aperture flange, at spaced intervals around the periphery of the glass, applying a bead or beads of sealant (8) at least on the outwardly facing surface of the window aperture flange (1), locating the glass with the fixing clips attached in the window aperture and pressing down on to the sealant bead(s), and further pressing the glass home towards the flange until the fixing clips act under the applied pressure and against their resilience so as to deform intermediate sections B thereof sufficiently to permit their catch means to pass through the flange aperture, release of said further pressure permitting the fixing clips, due to their resilience, to restore into their original form and cause the catch means to locate behind said flange and thus positively hold the glass in position within the window aperture and pressed against the sealant. The invention includes within its scope fixing clips suitable for use with the method, and a flush glass system fitted by use of the method and the fixing clips.

8 Claims, 13 Drawing Figures

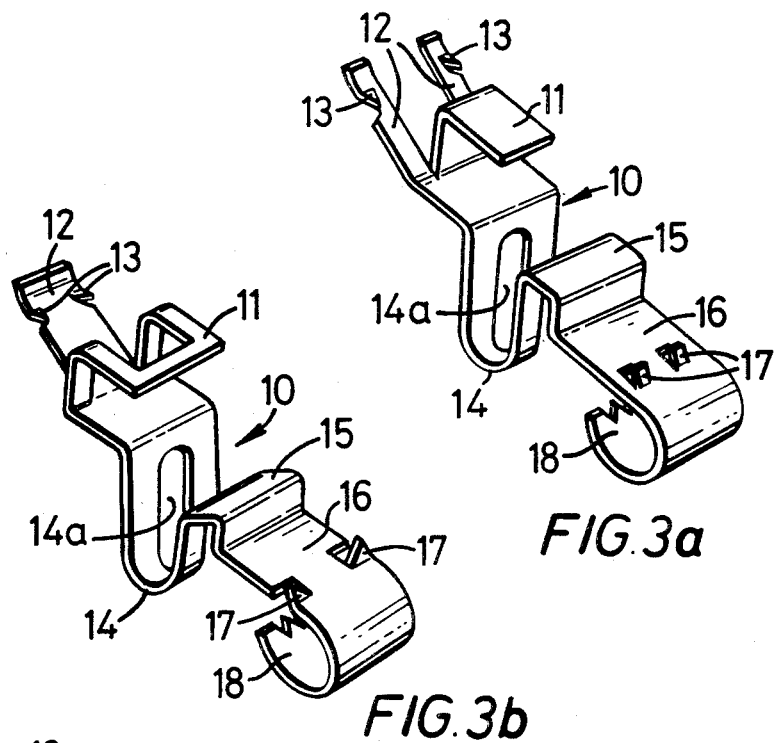
FIG.3a
FIG.3b
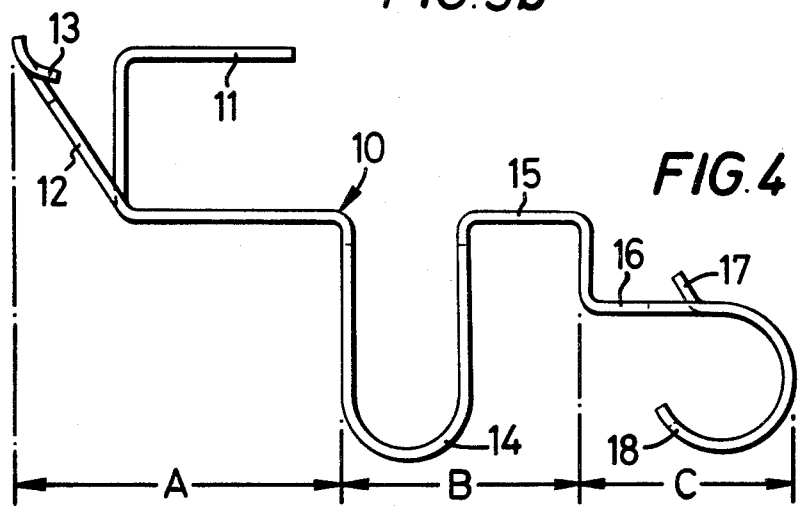
FIG.4

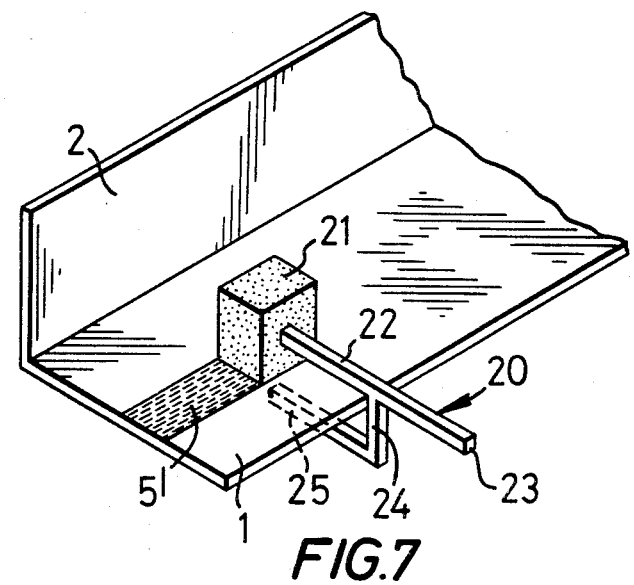
FIG.7
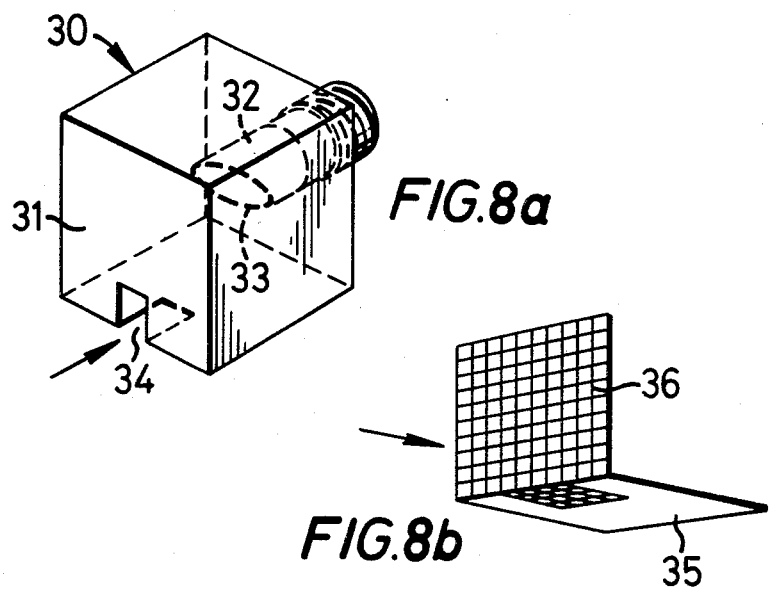
FIG.8a
FIG.8b

CLIP AND ARRANGEMENT FOR FLUSH FITTING OF WINDOWS

This invention relates to a method and arrangement for the flush fitting of glass windows. Such methods and arrangements are already in use for motor vehicles and are generally referred to as "Flush Glass Systems".

Among the advantages claimed for the "Flush Glass System" of fitting windows to motor vehicle bodies are:
(i) an improvement in the aerodynamic properties of the motor vehicle,
(ii) a reduction in the cost of manufacture,
(iii) improved retention properties of the fitted glass to the body in the event of impact, and
(iv) a reduction in fuel consumption.

The Flush Glass System is at present in its infancy in the motor industry. Manufacturers have started production of vehicles designed to take Flush Glass Windows, and already two serious problems have been revealed, as follows:
(i) the present method of fitting the glass to the vehicle body on an assembly line has proved difficult and has resulted in a high incidence of imperfect adhesion, because of unavoidable vibrations sustained by the vehicle after fitting on the assembly line. As a result, the need to replace defectively sealed windows has proved particularly expensive on and off the assembly line both in time and labour.
(ii) after assembly and delivery to a user, the user can be greatly inconvenienced, since the present procedure for replacement is both lengthy and expensive, and the vehicle can be off the road for several hours.

Referring to FIG. 1 of the accompanying drawings, the present assembly procedure for a Flush Glass System is as follows:
(a) Clean flanges 1 and aperture walls 2 of the vehicle body with cleaning fluid,
(b) Clean the inner peripheral surface of the glass 4 with cleaning fluid,
(c) Apply primer 5 to flanges 1 and aperture walls 2 of vehicle body, and allow to dry,
(d) Assemble interior finisher 6 around the flanges 1,
(e) Apply primer 3 to the inner peripheral surface of the glass, and allow to dry,
(f) Assemble exterior finisher 7 around the glass 4,
(g) Apply a bead of heated sealant 8 to said flanges, and
(h) Fit glass 4 to aperture and press on to the sealant 8 to create waterproof seal.

The present system relies entirely on the bonding efficiency of the primer to the surface to which it is applied as well as the sealant to the primer. However, since the sealants used take a number of days to cure adequately to withstand pressure, and since the modern motor vehicle is so designed that, with the windows closed, when the last door is slammed shut a pressure is created within the vehicle, there is a distinct possibility whilst the sealant is initially curing that the fitted windows are displaced. Consequently, due both to the vibration problems on the assembly line, and to curing problems during replacement, the present system cannot guarantee a seal, let alone a watertight seal.

An object of the invention is to provide a fitting method and arrangement which eliminates the risk of imperfect fitting and also the displacement of glass, either by vibration during fitting, or by any other occurrence thereafter, which ensures a watertight seal when used with a bonding sealant/primer, and which enables the vehicle to be used immediately after glass fitting.

According to first aspect of this invention, a method of applying a glass to a flanged window aperture comprises the steps of attaching resilient fixing clips, which have means for attachment to the glass and catch means for locating on the window aperture flange, at spaced intervals around the periphery of the glass, applying a bead or beads of sealant at least on the outwardly facing surface of the window aperture flange, locating the glass with the fixing clips attached in the window aperture and pressing down on to the sealant bead(s), and further pressing the glass home towards the flange until the fixing clips act under the applied pressure and against their resilience so as to deform sufficiently to permit their catch means to pass through the flange aperture, release of said further pressure permitting the fixing clips, due to their resilience, to restore into their original form and cause the catch means to locate behind said flange and thus positively hold the glass in position within the window aperture and pressed against the sealant.

Preferably, a special sealant and primer is used to produce a "bonded" system, the primer being applied to the inner peripheral surface of the glass in a manner known per se, and as a stripe to the outwardly facing surface of the flange, the stripe being spaced from but extending parallel to the window aperture walls.

Conveniently the primer stripe may be applied using a tool comprising an applicator part on one end of an arm, the arm having an abutment at a required distance along its length which slides against the flange edge whilst the tool is being drawn along said flange to produce said stripe.

According to a second aspect of this invention, a resilient fixing clip for use in applying a glass to a flanged window aperture comprises an elongate strip of resilient material which is bent, or otherwise formed, to provide a channel part at one end for fitting over an edge of the glass to be fitted, catch means at the other end in the form of an appropriately shaped tongue part, and an intermediate section which is shaped such that it will deform and cause elongation of the clip in response to an applied pressure, the resilience of the material being sufficient to ensure that the clip will be restored to its original shape when the applied pressure is removed.

Preferably, the intermediate section comprises a "U" shaped part formed with an opening therein, and an adjacent inverted "U"-shaped part, the arrangement being such that the limbs of the parts tend to open out when pressure is applied and thus elongate the fixing clip.

The appropriately shaped tongue part is preferably of a curled form with the end edge directed inwardly to enable it to ride smoothly over the edge of the flange and to lock positively behind said flange during fitting.

The end of the clip defining the channel part may also be formed with outward and upwardly angled outrigger arms which, with the clips spaced around the glass to be fitted, act together to centralise the glass within the window aperture.

According to a third aspect of this invention, a flush glass system of the kind in which a glass is retained by sealant within a flanged window aperture, is characterised by the glass having a number of resilient fixing clips as defined above spaced around it periphery, which clips act to retain the glass positively in the window aperture by locking behind the flange and to press the glass down against sealant which is applied to the flange.

Thus, the fitting method and arrangement provided by the present invention ensures that the glass is held positively and securely immediately it is fitted and for the duration of the curing time for the sealant and primer and thereafter. The resulting economies that are possible in both manufacture and replacement costs in the event of window breakage can benefit both manufacturer and car owner, and indeed could result in a lowering of insurance premiums, or at least stabilising them.

Figure 2:
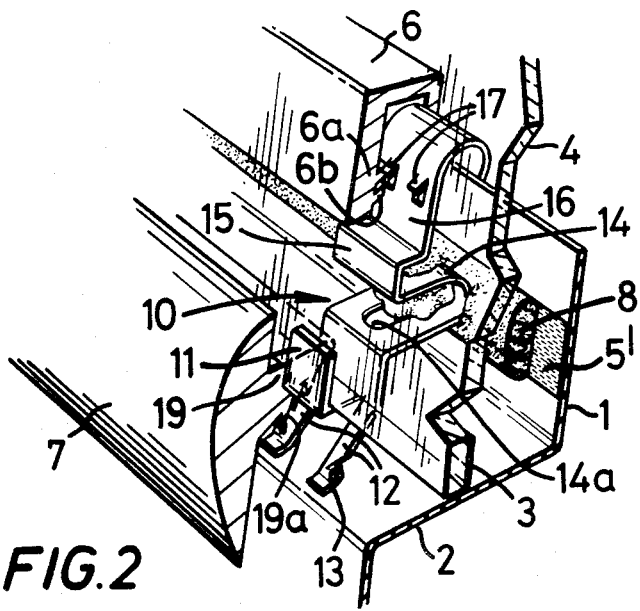
Figure 5A:
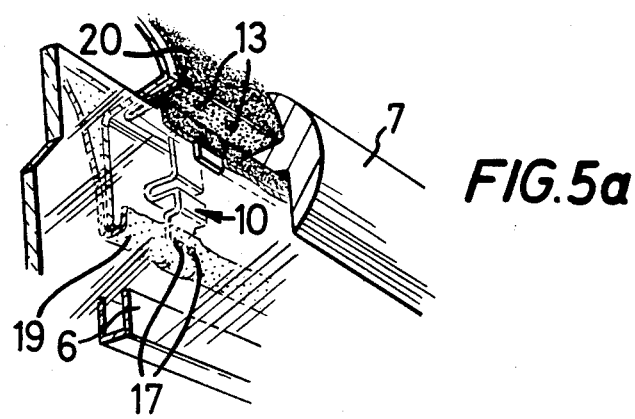
Figure 5B:
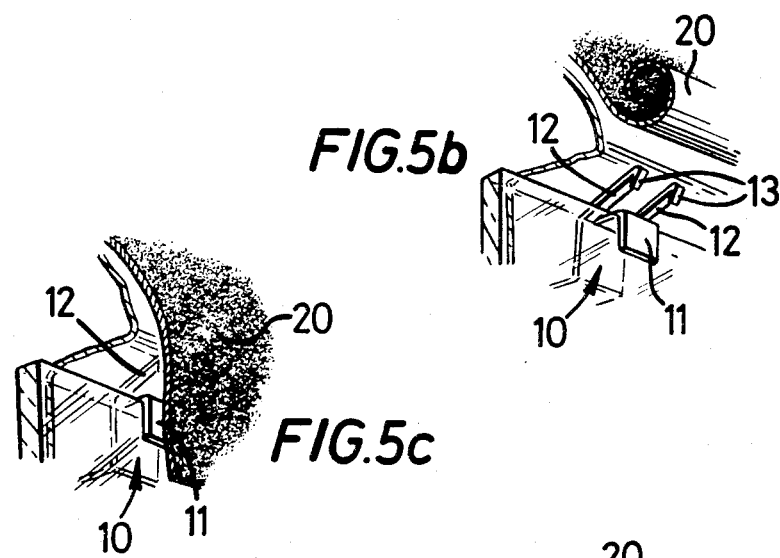
Figure 5C:
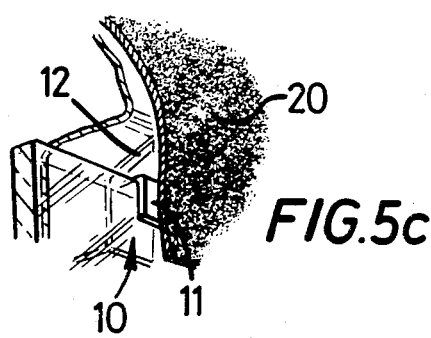
Figure 5D:
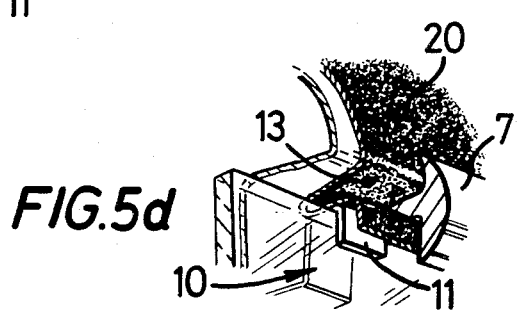
Figure 6:
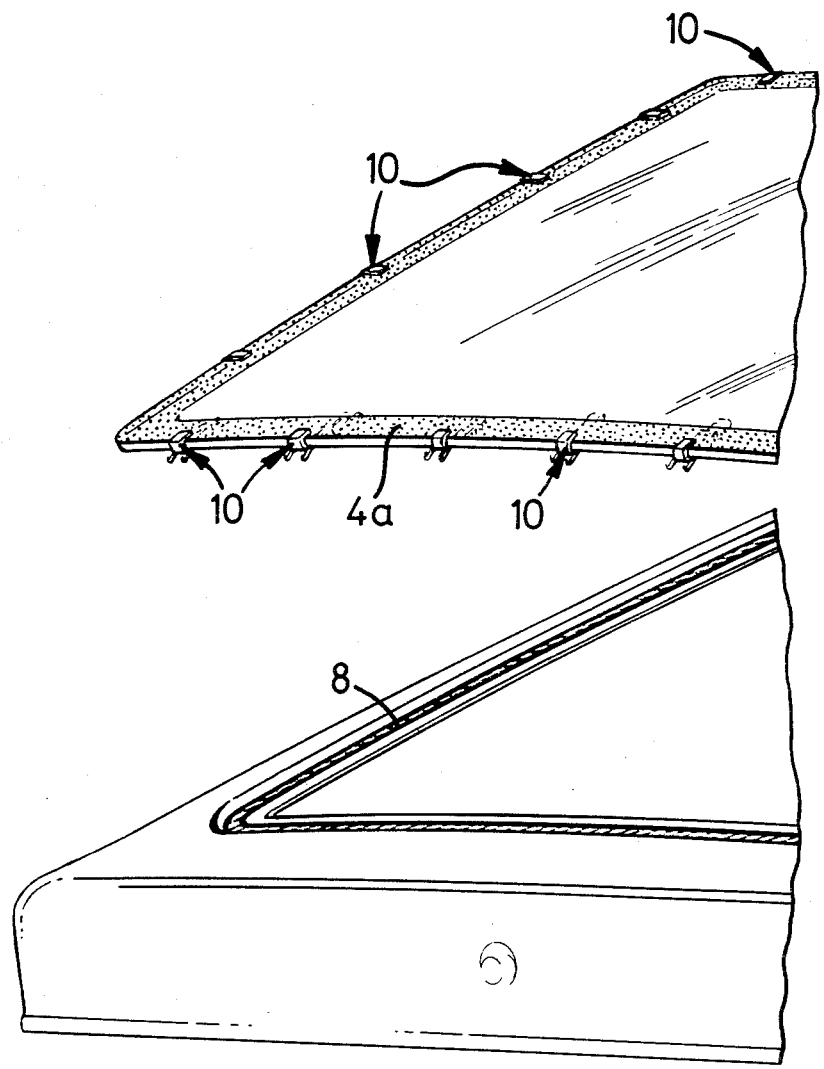

In order that the invention will be readily understood, and further features made apparent, one preferred embodiment thereof will now be described, with reference to the accompanying drawings, in which:

FIG. 1 is a fragmentary perspective view partially in section of the present flush glass fitting arrangement discussed hereinbefore, FIG. 2 is a fragmentary perspective view similar to FIG. 1 of said preferred embodiment according to the invention, FIGS. 3a and 3b are general perspective views of two forms of suitable fixing clip for use in the preferred embodiment, FIG. 4 is a side elevation of the clip shown in FIG. 3a to an enlarged scale, FIGS. 5a to 5d are fragmentary perspective views showing the stages of assembling a windscreen complete with a vinyl roof covering and the head lining, FIG. 6 is a fragmentary perspective view showing a stage in fixing a backlight to the hatchback of a motor vehicle, FIG. 7 is a diagrammatic view of a primer tool for use with the preferred embodiment, and FIGS. 8a and b are diagrammatic views of a sealant control apparatus for use with the preferred embodiment.

Referring to FIGS. 2 and 3, an important difference between said preferred embodiment and the present method and arrangement for flush glass fitting described with reference to FIG. 1 is the provision of special fixing clips by which, during fitting, and whilst the sealant and primer are curing, the glass can be held positively within its window aperture in the vehicle body. Referring particularly to FIGS. 3a and 4, in one form each fixing clip 10 is elongate and is bent or otherwise formed from a strip of resilient material, e.g. spring steel, and comprises an outer section A which provides a channel portion 11 which is dimensioned to be a tight sliding fit on to the edge of the glass to be fitted, and a pair of outrigger arms 12 which are angled to extend upwardly and outwardly and have bent-out tangs 13, an intermediate section B which provides a "U"-shaped part 14 which defines an opening 14a therein, and an adjacent inverted "U"-shaped part 15, and an inner section C which provides a platform part 16 with tangs 17 extending upwardly therefrom and a curled tongue part 18. Referring to FIG. 3b, in its alternative form, the clip is basically similar to that described above, but has a single relatively wide central outrigger arm 12 formed as a cut-out from the channel portion 11.

Referring now to FIG. 2, the assembly procedure for a Flush Glass System according to the preferred embodiment is as follows (those parts which are equivalent to parts of the prior art system described above with reference to FIG. 1 are given like reference numerals):

(a) Clean flanges 1 and aperture walls 2 of the vehicle body with cleaning fluid, (b) Clean inner peripheral surface of the glass 4 with cleaning fluid, (c) Apply one thin sripe of primer 5' to the flanges 1 parallel to, but spaced from the aperture walls 2 as shown, and allow to dry, (d) Apply primer 3 to the inner peripheral surface of the glass 4 and allow to dry, (e) Assemble fixing clips 10 via their channels 11 at spaced positions around the periphery of the glass 4, (f) Apply a bead or beads of heated sealant 8 to flanges 1 sufficient to reach the primed area 3 of the glass 4 when pressed home, (g) Place the glass 4 approximately centrally within the window aperture and press home to effect a watertight seal. As the glass is pressed into the window aperture defined by the walls 2, the fixing clips 10 automatically guide and centralise the glass due to the action of the outrigger arms 12. Then, as the glass is pressed home, the sealant 8 is forced around the periphery of the glass and also through the openings 14a of the "U"-shaped parts 14 of the clips 10. Also, as the glass is pressed more fully into position, the "U"-shaped parts 14 of the clips will seat on respective flanges 1 and will deform to open out against the resilience of the clip material. This causes an effective, temporary elongation of the clips sufficient to allow their curled ends 18 to ride over the inner edges of respective flanges 1 and pass through the flange aperture. When the pressing force is released the "U"-shaped parts 14, due to their resilience, will be restored to their original shape; hence the curled edges will lock under their respective edges of the flanges 1 so as to secure the glass 4 positively in its centralised position within its window aperture. When the sealant 8 cures the clips 10 will retain the glass in a particularly secure manner. An effect of this arrangement is that, when cured, the bead of sealant 8 is held pressed against the aperture flanges 1, via the fixing clips 10, to provide a safeguard against contamination and to ensure a watertight seal. It will be appreciated here that the "U"-shaped parts 14 and 15 are designed especially to ensure that there is a positive watertight seal in the area where the clip 10 is assembled to the glass 4 and provide a predetermined spacing from the flange 1 to guarantee that the outer surface of the glass 4 is flush with the skin panels of the aperture surrounds.

(h) Assemble the exterior finisher 7 around the glass 4. It is to be noted from FIG. 2 that the finisher 7 has a chamfered tongue part 19 with a series of teeth 19a which interact with the bent-out tangs 13 of the arms 12 of the clips 10 to retain the finisher positively in place, (i) Assemble the interior finisher 6 around the flanges 1. It is to be noted from FIG. 2 that the finisher 6 is simply pressed home around the edges of the flanges and is positively retained by means of a tongue part 6a fitting between the inner surface of the glass 4 and the platform parts 16 of the clips 10, and teeth 6b which interact with the tangs 17 of said parts 16. These latter parts are so designed that they facilitate assembly and removal of the finisher 6, particularly in the dash panel area of a motor vehicle. This guarantees complete concealment of the clips 10 and sealant, when viewed from inside and outside of the vehicle.

It will be appreciated that, in accordance with the invention, the glass 4 and sealant 8 are locked to the flanges 1 by the clips 10 to retain the glass and sealant positively and securely in position throughout the curing process, either on a vehicle assembly line, or immediately after replacement of a broken window. Also by using the clips 10, most vehicles in present use can be modified to the Flush Glass System.

It will also be appreciated that the sealant bonds the glass 4 only on to primed surfaces, and since the preferred embodiment ensures that the sealant 8 is held pressed against the flanges 1 as referred to above, and also to the inner peripheral surface of the glass, particularly the primed stripe 5' may be kept to a minimum.

Referring to FIG. 5, it can be readily seen that the clips 10 can also be used during car assembly to fix the edges of the interior lining 19 (via the tangs 17) as well as a vinyl, or other material, roof covering 20 (via tangs 13).

Referring to FIG. 6 the clips 10 are shown spaced around a backlight for a hatchback prior to fitting into its aperture. As shown dotted, the edges of the glass, or backlight to be fitted are normally coated with a ceramic material 4a protect the sealant bead or beads 8 from ultraviolet rays from the sun. However, with the arrangement of the invention, it is possible to dimension the finishers 6 and 7 sufficiently to provide such protection, thereby eliminating the need for a ceramic coating.

Referring to FIG. 7, the stripe 5' on the flanges 1 can be simply applied using a tool 20 comprising a cube 21 of sponge, or other suitable material, which is carried on one end of an arm 22; the other end of the arm is provided with a handle 23 and, at an appropriate distance along the arm, a rod 24 extends transversely and is attached to a control arm 25. Thus, to apply a stripe 5', the cube 21 is dipped into the primer and is stroked along the flanges 1 at a position spaced from the aperture walls 2 which is regulated by the rod 24 engaging the inner edges of the flanges, the control arm fitting under the flanges and being held in sliding contact with the undersides of said flanges.

Referring now to FIG. 8, the bead of sealant 8 can be applied effectively and efficiently using extrusion control apparatus 30 in the form of a casing 31 having a nozzle 32 for connection to the usual sealant extrusion gun (not shown) the nozzle end 33 being chamfered so as to direct extruded sealant towards the floor of the casing, the latter having an opening 34 of such pre-set dimensions as to ensure the deposition of a sealant bead(s) 8 on to the flanges which is of a required width and depth. To set the dimensions of the opening, a graticule 35 with measured grid lines 36 thereon can be used, the operator cutting the opening 34 to suit. Such apparatus can substantially reduce, or possibly eliminate, the necessity of having a clean-up operation to remove excess sealant, and can also provide a maximum bond using the minimum amount of sealant.

These above described methods of primer application and bead deposition can reduce the replacement time by approximately 50% compared with the present Flush Glass System, thus equating it with the present replacement time for conventional glass systems, while still retaining the status of the bonded system. The use of fixing clips 10 to positively retain the glass 4 has the advantage that, in an emergency, or if preferred, a conventional sealant can be used for the Flush Glass System in place of the presently used primer and special sealant. In other words, the system can be of a 'non-bonded' type.

It will be further appreciated that no manufacturing problems are likely to arise with the method and arrangement of this invention, since the very nature of the new system is simple and straightforward. On an assembly line, the speed of the conveyor would be unaffected whether the glass is fitted manually or automatically, and a highly efficient utilisation of sealant can be achieved by using the control apparatus 30 described above, applying one single bead, or possibly two narrow beads of sealant directly on to the flanges. The size of the opening 34 in the apparatus 30 will control the amount of sealant extruded, which amount should be such that, when the glass is pressed onto the sealant bead produced, which pressing is limited by contact with the fixing clips 10, the bead will not spread onto the aperture wall 2, but will nevertheless be of a sufficient depth to be pressed against the primer stripe 5' to adhere thereto to create a watertight seal, and also to provide a cushion (when cured) against which the glass is held pressed. The interior and exterior finishers 6 and 7 can be of a continuous type, which can be readily removed if the area of the vehicle body adjacent to the glass has to be repaired and/or resprayed.

It will be appreciated from the foregoing that a most important advantage of the invention is that, by the use of the fixing clips 10, a motor vehicle can be used on the road immediately, the driver being secure in the knowledge that the glass 4 will be retained in its aperture even whilst the sealant is curing. This is particularly important where glass replacement has been carried out by the roadside or motorway by a mobile replacement service.

I claim:

1. A resilient fixing clip for use in applying a glass to a flange window aperture comprising an elongate narrow strip of resilient material which is bent, or otherwise formed, to provide a channel part at one end for fitting over an edge of the glass to be fitted with opposite sides of the channel bearing on opposite faces of the glass, catch means at the other end in the form of an appropriately shaped tongue part for latching onto a flange around said window aperture, and an intermediate section which is shaped with a configured section such that it will deform and allow elongation between one end and the other end of the clip in response to an applied pressure, the resilience of the material being sufficient to ensure that the clip will tend to be restored to its original shape when the applied pressure is removed.

2. A resilient fixing clip according to claim 1, characterised in that the intermediate section comprises a "U"-shaped part formed, and an adjacent inverted "U"-shaped part, the arrangement being such that the limbs of the parts tend to open out when pressure is applied and thus elongate the fixing clip.

3. A resilient fixing clip according to claim 1, characterised in that the appropriately shaped tongue part is of a curled form with the end edge directed inwardly to enable it to ride smoothly over the edge of the flange and to lock positively hehind said flange during fitting.

4. A resilient fixing clip according to claim 1, characterised in that the end of the clip defining the channel part is formed with at least one outward and upwardly angled outrigger arm which, with the clips spaced around the edge of the glass to be fitted, act together to centralise the glass within the window aperture.

5. A flush glass system of the kind in which a glass is retained by sealant within a flanged window aperture, characterised by the glass having a number of resilient fixing clips located at spaced positions around its periphery, which clips act to retain the glass positively in the window aperture by locking behind the flange and pressing the glass down against sealant which is applied to the face of the flange, at least two of said clips each comprising an elongate narrow strip of resilient material which is bent, or otherwise formed, to provide a channel part at one end for fitting over an edge of the glass to be fitted with opposite sides of the channel bearing on opposite faces of the glass, catch means at the other end in the form of an appropriately shaped tongue part for latching onto a flange around said window aperture, and an intermediate section which is shaped with a configured section such that it will deform and allow elongation between one end and the other end of the clip in response to an applied pressure, the resilience of the material being sufficient to ensure that the clip will tend to be restored to its original shape when the applied pressure is removed.

6. A flush glass system according to claim 5, applied to a motor vehicle, characterised in that those edges of the interior lining of the vehicle adjacent the window aperture fitted with the system are fixed by tangs, or like projections provided in said other (tongue part) ends of said fixing clip, and retained by interior finisher strips located over said other ends around the inner periphery of the window aperture, and also fixed by said tangs.

7. A flush glass system according to claim 6, characterised in that said one (channel) end is provided with further tangs, or like projections by which exterior finisher strips are fixed between the edge of the glass and the aperture.

8. A flush glass system of the kind in which a glass is retained by sealant within a flanged window aperture, characterised by the glass having a number of resilient fixing clips located at spaced positions around its periphery, which clips act to retain the glass positively in the window aperture by locking behind the flange and pressing the glass down against sealant which is applied to the face of the flange each clip comprising
  (a) a portion for clamping onto the edge of the glass sheet
  (b) a portion for latching onto the backside of the flange, and
  (c) a resilient elongation comprising an elongated narrow strip section between the edge engaging portion and the latching portion, said resilient portion having a configured section which will deform, when compressed between the front face of the flange and the back face of the glass, will elongate between one end and the other serving to move the latch portion away from the glass edge and over the edge of the flange, the resiliency of the elongated section permitting the elongation section to tend to return to its original shape upon removal of compressive force applied against the glass thereby pulling the latch portion into holding engagement with the back side of the flange adjacent the edge of the flange.

* * * * *